US 6,681,792 B2

(12) United States Patent
Edward et al.

(10) Patent No.: US 6,681,792 B2
(45) Date of Patent: Jan. 27, 2004

(54) REDUCED-LENGTH SLEEVE VALVE

(75) Inventors: John Edward, Fresno, CA (US); Brad Matejek, Fresno, CA (US); Erick Maitre, Fresno, CA (US); Eric Brewer, Fresno, CA (US)

(73) Assignee: Core Industries, Charlotte, NC (US)

( * ) Notice: Subject to any disclaimer, the term of this patent is extended or adjusted under 35 U.S.C. 154(b) by 0 days.

(21) Appl. No.: 09/948,258

(22) Filed: Sep. 7, 2001

(65) Prior Publication Data

US 2002/0062863 A1 May 30, 2002

Related U.S. Application Data

(60) Provisional application No. 60/230,643, filed on Sep. 7, 2000.

(51) Int. Cl.[7] .................................................. F16K 3/24
(52) U.S. Cl. ..................... 137/15.06; 137/219; 137/239; 137/625.3
(58) Field of Search ............................. 137/15.06, 219, 137/239, 625.3

(56) References Cited

U.S. PATENT DOCUMENTS

| | | | |
|---|---|---|---|
| 3,605,787 A | 9/1971 | Krogfoss et al. ............ 137/219 |
| 3,821,968 A | 7/1974 | Barb ........................ 137/625.3 |
| 4,036,248 A | 7/1977 | Yoshimori et al. ........... 137/271 |
| 4,040,443 A | 8/1977 | Okada et al. ................ 137/546 |
| 4,103,702 A | 8/1978 | Duthion et al. .............. 137/375 |
| 4,244,388 A | 1/1981 | Feiss ......................... 137/116 |
| 4,375,821 A | 3/1983 | Nanao ......................... 137/239 |
| 4,508,138 A | 4/1985 | Dixon ......................... 137/239 |
| 4,520,846 A | 6/1985 | Dixon ....................... 137/625.3 |
| 4,526,192 A | 7/1985 | Dixon ......................... 137/244 |
| 4,611,630 A | * 9/1986 | Muchow et al. ............. 137/219 |
| 4,635,678 A | 1/1987 | Peterman et al. ............ 137/551 |
| 5,116,252 A | 5/1992 | Hartman ..................... 137/625.3 |
| 5,490,535 A | * 2/1996 | Fromm ........................ 137/219 |
| 5,503,176 A | 4/1996 | Dunmire et al. .............. 137/15 |
| 5,509,437 A | 4/1996 | Merrett ........................ 137/15 |
| 5,584,314 A | 12/1996 | Bron .......................... 137/239 |
| 5,950,660 A | 9/1999 | Hartman et al. ............. 137/219 |

* cited by examiner

Primary Examiner—Gerald A. Michalsky
(74) Attorney, Agent, or Firm—Baker & Hostetler LLP

(57) ABSTRACT

A multiple opening sleeve valve is provided with a gate movable to control flow or pressure without the need for axial movement of a component through a pressure-containing seal. A gate actuator can include a drive rod and nut coupled to a gate substantially internal to the valve housing without the need for grease or similar external lubrication. The valve can provide for relatively high in-line gate-moving force, a reduction in force or torque requirements for operation, increased ease of wear-part replacement and decreased overall valve length, compared to previous valve configurations of comparable size or capacity.

23 Claims, 3 Drawing Sheets

REDUCED-LENGTH SLEEVE VALVE

CROSS REFERENCE TO RELATED APPLICATION

Priority is claimed from U.S. Provisional Application Serial No. 60/230,643 filed Sep. 7, 2000 entitled "Reduced-Length Sleeve Valve," which is incorporated by reference herein in its entirety.

FIELD OF THE INVENTION

The present invention is directed to a multiple-opening sleeve valve of a type which can be used for flow control and pressure dissipation and in particular to a multiple opening sleeve valve having a reduced length, compared to at least some previous configurations.

BACKGROUND INFORMATION

Multiple-orifice sleeve valves are used in a number of applications including flow control and pressure dissipation applications, such as applications requiring reducing a high inlet pressure to a lower maximum output pressure through a relatively wide range of flows. For example, multiple-orifice sleeve valves can be used for receiving flow in the range of 0 to 250 cubic feet per second (cfs) at a pressure of about 85 pounds per square inch (psi) or more, and outputting at a pressure maximum of 12 psi and the like. A description of one type of multiple opening sleeve valve can be found, e.g., in U.S. Pat. No. 4,508,138 issued Apr. 2, 1985, incorporated herein by reference. Some types of sleeve valves have been configured to provide desired performance while reducing cavitation, noise, wear and/or vibration leading to long service life, including, e.g. providing tapered sleeve openings and/or cavitation control. Examples include at least some devices sold under the trade name POLYJET®, available from CMB Industries, Fresno, Calif.

Although multiple opening sleeve valves have proved useful and successful in numerous applications, it is believed there are still opportunities for providing new configurations, e.g. to assist in meeting certain needs or providing certain conveniences. At least some previous configurations of multiple-opening sleeve valves have included movable gates (or rings) and/or actuators therefor, which have led to devices which occupy a certain amount of length. The length constraints in such previous devices may lead not only to limitations on the location in which the valve can be placed, but also direct and indirect cost effects, including the size and configuration of buildings or other enclosures for the valve, the types of existing systems into which it is feasible to retrofit the valves, the weight (and thus manufacturing, storage and transportation costs) for the valve and the like. Accordingly, it would be useful to provide a multiple-orifice sleeve valve which can be provided in a reduced-length configuration (compared to at least certain previous valves) and/or which can be fabricated, shipped, installed or enclosed at reduced costs (compared to previous valves).

Some previous valves provided for linear movement using a linkage or levering mechanism, such as a yoke mechanism. Typically in such designs, the source of the force for achieving movement (such as a motor or the like) outputs force in a direction other than parallel to the gate movement (during at least a portion of the stroke). Such configurations have certain disadvantages including loss of inefficiency and thus lower effective operating forces for a given motor output, and/or limited range of effective stroke length (and thus limited range of gate movement). Accordingly, it would be useful to provide a reduced-length multiple orifice sleeve valve which can avoid at least some efficiency losses and/or stroke length limitations, e.g., compared to non-in-line and/or yoke configurations.

In many previous approaches, substantially all of the actuation mechanism was configured so as not to be internal to the valve. Although these approaches were useful in some regards, such as avoiding the potential for actuator lubricants to contaminate the water or other fluid, substantially-external configurations have created certain pressure imbalances and/or drag associated with seals or packing, leading to high effective operating (gate opening or closing) torque. Accordingly, it would be useful to provide a multiple orifice sleeve valve in which it is feasible to provide some or substantially all of the actuator or actuator linkage in an internal mounting to the valve or otherwise facilitating a reduction in the operating torque.

In many previous approaches, wearing components associated with gate movement had been relatively large and/or inaccessible, often requiring extensive disassembly, and associated valve down-time, for replacing components as wear occurs. Accordingly, it would be useful to provide a multiple orifice sleeve valve with improved ease of access to, and/or replacement of, at least certain wear components, e.g., for reducing maintenance down time and/or maintenance costs.

SUMMARY OF THE INVENTION

The present invention includes the recognition of the existence, source and/or nature of problems in previous approaches including as described herein. In one aspect, the present invention provides for moving the gate by rotating a threaded rod which engages a nut or other threaded hole, substantially fixedly coupled with respect to the gate. Preferably, the threaded rod is engaged at a position, along the gate, which is spaced from the upstream-most edge of the gate and, preferably, substantially adjacent the downstream-most edge of the gate. In one aspect, the threaded rod and/or nut are formed from materials which do not require external lubrication (i.e. lubrication other than whatever lubricating qualities may be provided by the fluid normally flowing through the valve), such as using stainless steel and/or brass. In the absence of external lubricants, it becomes feasible to provide the threaded rod/nut configuration such that the threaded rod may normally be in contact with the water (or other fluid flowing through the valve), e.g. without the need for providing a sealed drive tube. Using a threaded nut or similar configuration, rather than a drive tube, reduces the total length of the drive structure required, permitting the sleeve valve to have a length which is shorter than, e.g., drive tube configurations, such as being shorter by an amount about equal to the sleeve diameter (or more). In this way, a multiple-opening sleeve valve can be provided with a reduced length while providing a gate actuator/drive system which is substantially in-line (i.e., providing force substantially parallel to the direction of gate movement substantially throughout the stroke) thus avoiding deficiencies associated with yoke drives or similar approaches (such as power inefficiencies and/or relatively short effective stroke lengths).

In one aspect, a multiple opening sleeve valve is provided with a gate movable to control flow or pressure without the need for axial movement of a component through a pressure-containing seal. A gate actuator can include a drive rod and nut coupled to a gate substantially internal to the valve housing without the need for grease or similar external lubrication. The valve can provide for relatively high in-line gate-moving force, a reduction in force or torque requirements for operation, increased ease of wear-part replacement and decreased overall valve length, compared to previous valve configurations of comparable size or capacity.

DETAILED DESCRIPTION

Figure 1:
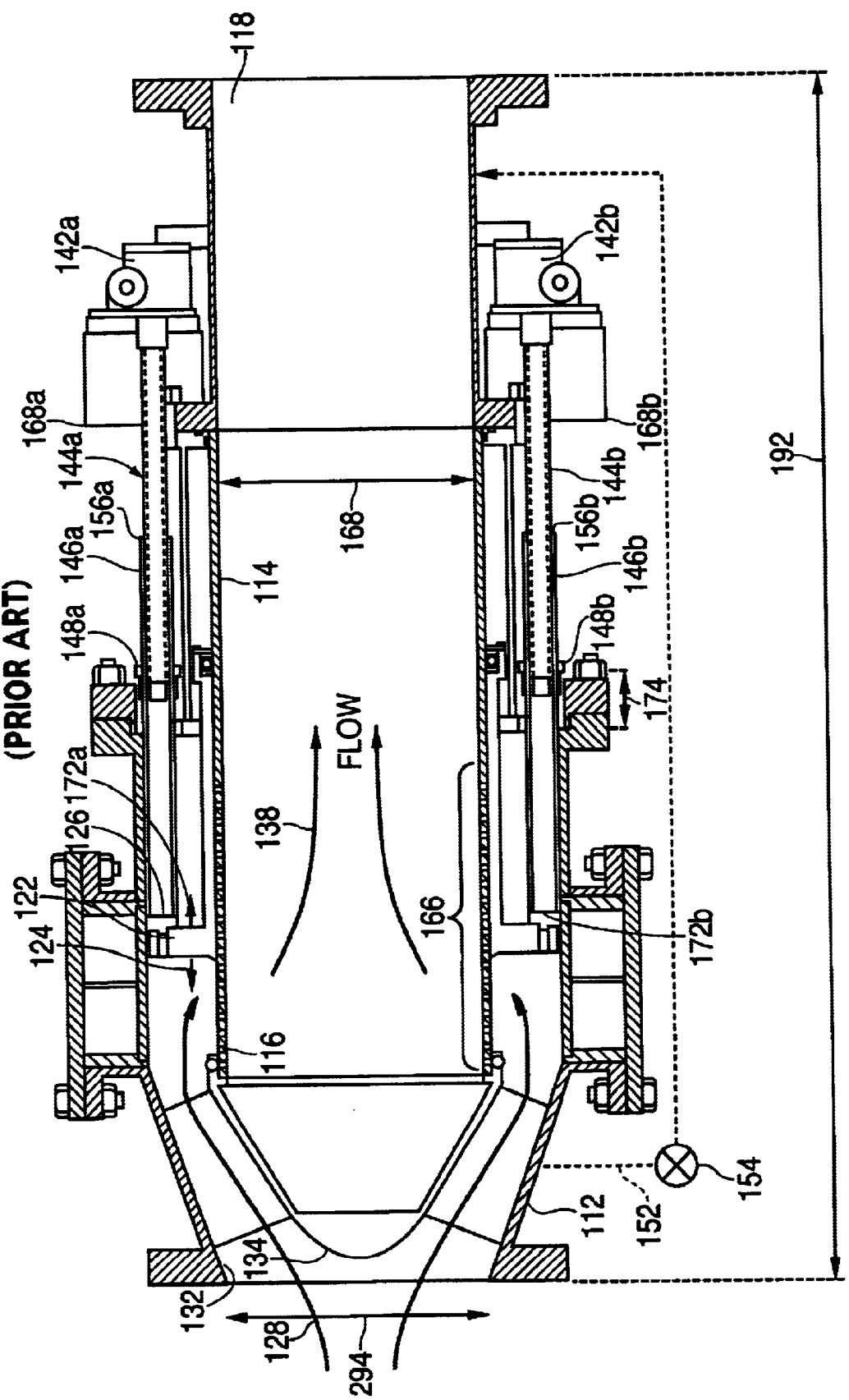
FIG. 1 is a cross sectional view of a multiple-opening sleeve valve according to previous approaches.

Before describing features of the present invention, certain aspects of a multiple opening sleeve valve according to previous approaches will be described. In the configuration of FIG. 1, an inlet housing 112 substantially surrounds a generally cylindrical sleeve member 114 having a plurality of openings or nozzles 116 extending through the wall of the sleeve in an upstream portion thereof. The downstream portion of the sleeve provides fluid communication to the valve outlet 118. An annular valve gate or ring 122 can be sealingly positioned to cover some of the nozzles 116, as shown, and can also be moved in an upstream direction 124 to cover substantially all of the nozzles 116, or a downstream direction 126 to uncover substantially all of the nozzles 116. When at least some of the nozzles 116 are uncovered, the (typically high pressure) inlet flow 128 is received through the inlet opening 132 and diverges around a nose member 134. The high pressure fluid passes through the uncovered nozzles 116 and travels 138 through the interior of the sleeve 114 to pass out the (low pressure) outlet opening 118. By moving the gate 122 so as to progressively cover 124 or uncover 126 more of the nozzles 116, the outlet flow and/or pressure can be changed. In the configuration depicted in FIG. 1, drive motors or other sources of force 142a, b can be used to rotate drive screws 144a, b which are threadingly received in and engaged with interiorly-threaded drive tubes 146a, b. The upstream ends 172a, b of the drive tubes 146a, b are closed or sealed and the fluid which flows through the valve does not enter the interior of the drive tubes 146a, b. The interior of the drive tubes 146a, b are sealed with respect to the (high pressure) fluid flow 128, 138 (e.g. via packing or other seals 148a, b) and the interior of the tubes 146a, b, as well as the drive screws 144a, b are thus external to the valve and do not contact the fluid which passes through the valve. Since the drive tubes 146a, b and drive screws 144a, b do not contact the fluid, the drive mechanism can be provided with external lubricants (oils, greases and the like), without risking contaminating the fluid with the lubricants. Many uses of control valves such as depicted in FIG. 1, require accommodating extremely high inlet pressures 128. Accordingly, the seals 148a, b must be extremely tight seals, for withstanding such high inlet pressures which, in general, provide relatively large friction resistance to movement of the tubes 146a, b past the seals 148a, b and, accordingly, relatively high torque must be provided to the drive screws 144a, b.

In some embodiments, a fluid path 152 directly from the inlet region to the interior of the sleeve, controlled, e.g., by a valve 154 can be provided to achieve backwash-type cleaning of the nozzles. In such configurations, a groove or similar structure may be provided in or coupled to the gate 122 to receive the back flow and directed to a waste outlet, e.g., as described in U.S. Pat. No. 4,508,138, incorporated herein by reference.

As can be seen from FIG. 1, the longitudinal distance occupied by the seal 174 contributes to the overall length of the valve. In the configuration of FIG. 1, if the gate 122 is moved upstream 124 to its extreme position (covering substantially all of the nozzles 116) the drive tube 146a must have its downstream edge 156a, b engaged with (and thus substantially aligned with) the seals 148a, b. If the gate 122 is moved in a downstream direction 126 to its extreme position (uncovering substantially all of the nozzles 116) the downstream edge 156a, b of the drive tube 146a, b must move a distance equal to the longitudinal extent of the gate movement, i.e., to the longitudinal extent of the nozzle area of the sleeve 166 which, in general, will be approximately equal to the sleeve diameter 168. Therefore, the valve according to FIG. 1 is configured such there is sufficient space between the seals 148a, b and the upstream edges 168a, b of the motor or drive assemblies 142a, b to accommodate a longitudinal movement of the drive tubes 146a, b substantially equal to the nozzle region 166 (and thus approximately equal to the sleeve diameter 168).

In the configuration of FIG. 1, the drive tubes 146a, b and drive screws 144a, b can be considered as wear components since they are moving components which, after an amount of normal use can be expected to wear to the point that replacement or repairs are required in order to avoid malfunction or poor function of the valve. In the configuration of FIG. 1, the repair or replacement of the drive tubes 146a, b and/or drive screws 144a, b will, in general, require substantially complete valve disassembly, often requiring maintenance time on the order of about one day or more (and thus requiring that the valve be placed out of service for one day or more).

Figure 2:
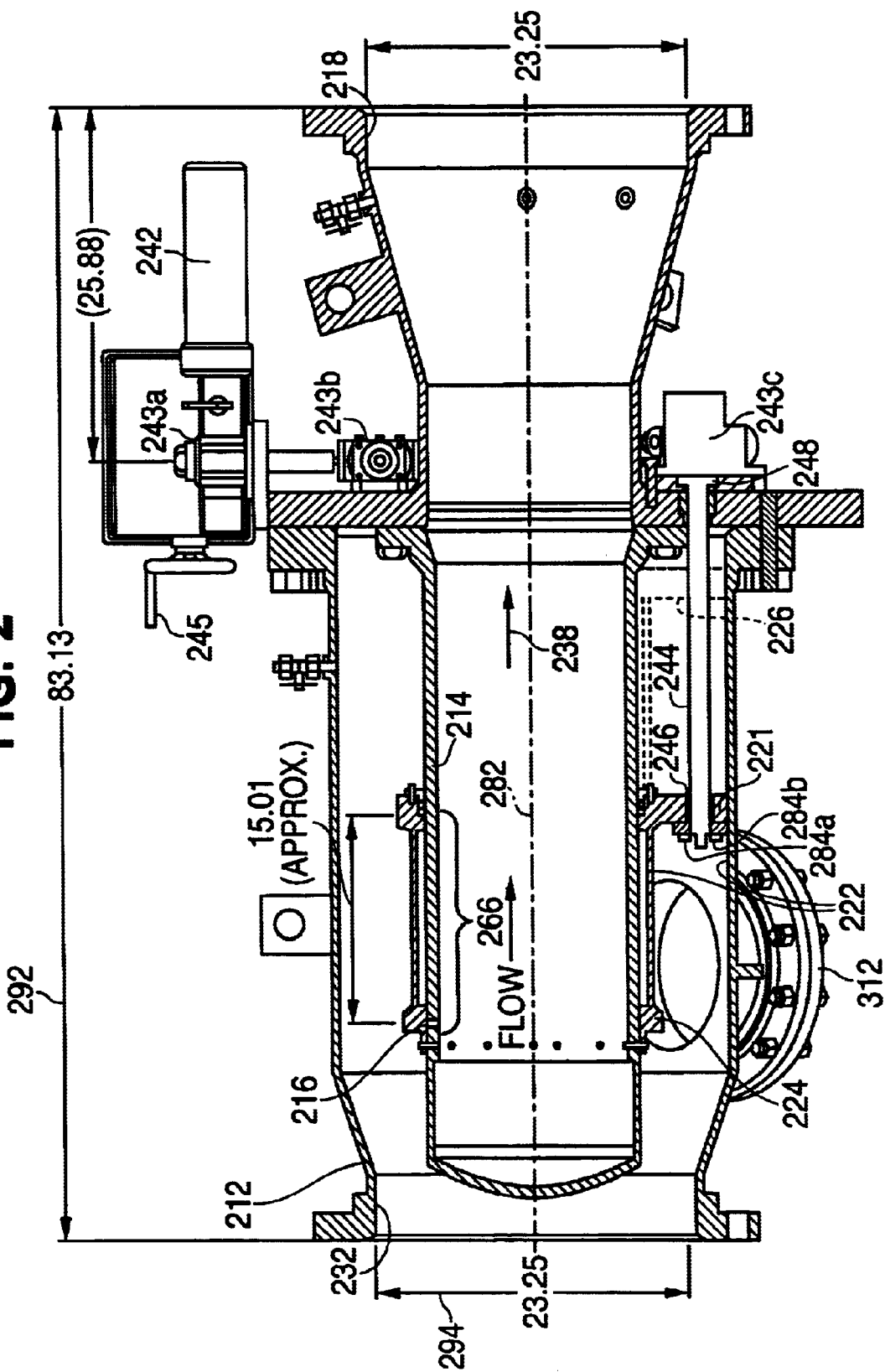
FIG. 2 is a cross sectional view of a multiple-opening sleeve valve according to an embodiment of the present invention.

FIG. 2 depicts a multi-opening sleeve valve according to an embodiment of the present invention. In the embodiment of FIG. 2, the threaded rod 244 (only one of which is visible in the view of FIG. 2) engages an internally threaded nut 246 positioned directly on a leg 221 of the movable gate 222. A motor 242 rotationally drives the threaded rod 244 through a series of links and gear boxes 243a, b, c. The rod 244 and nut 246 are made of materials which can operate acceptably in a environment which is wetted by, and in contact with, the fluid which flows through the valve, such as being formed of stainless steel and/or bronze. Accordingly, no external lubricants are needed or provided on the rod 244 or nut 246 and there is no risk of lubricants contaminating the fluid. The threaded rod 244 is retained using thrust bearings 248 and there is substantially no need for packings, chevron bearings or the like which can create frictional resistance to operation of the gate, as described above in connection with FIG. 1. Using the configuration of FIG. 2, the amount of torque required for moving the gate 222, in the embodiment of FIG. 2, for a given inlet diameter 294 is substantially less than the torque required for an equivalent inlet diameter 294 using configuration of FIG. 1, preferably less than about one-tenth the torque, more preferably less than about one-fifteenth the torque and even more preferably less than about one-twentieth the torque. As seen in FIG. 2, the threaded rod 244 provides force to the gate 222 having a force direction which is substantially longitudinal, i.e., substantially parallel to the axis of movement 282 of the gate 222 throughout the gate stroke.

In operation, a motor 242 and/or manual crank 245 is used to provide rotational movement, via gear train and boxes 243a, b, c to the threaded rod 244. As the threaded rod 244 rotates, the nut 246 coupled to the gate 244 will move longitudinally along the threaded rod 244, to position the gate 222 between an upstream-most position 224, substantially covering the nozzle area 266 of the sleeve 214, and a downstream-most position 226 (depicted in phantom) covering substantially all of the nozzle region 266 of the sleeve 214. High pressure fluid enters the inlet area 232 and passes through the uncovered nozzles 216 into the interior of the sleeve 214. The fluid moves downstream 238 to exit the low pressure outlet 218. When it is desired to change the outlet flow and/or pressure, the threaded rod 244 is rotated to cover or uncover additional nozzles. As compared to FIG. 1, the value of FIG. 2 can be provided with reduced length. For example, in one embodiment the total length 292 of a valve according to FIG. 2, having an inlet diameter 294 of 23.25 inches (about 60 cm) is 83.13 inches (about 211 cm). In contrast, the overall length 192 for a valve configured as in FIG. 1 having the same inlet diameter 294 is about 3.4% longer (having a total length of about 86 inches, about 218 cm) 192.

Figure 3:
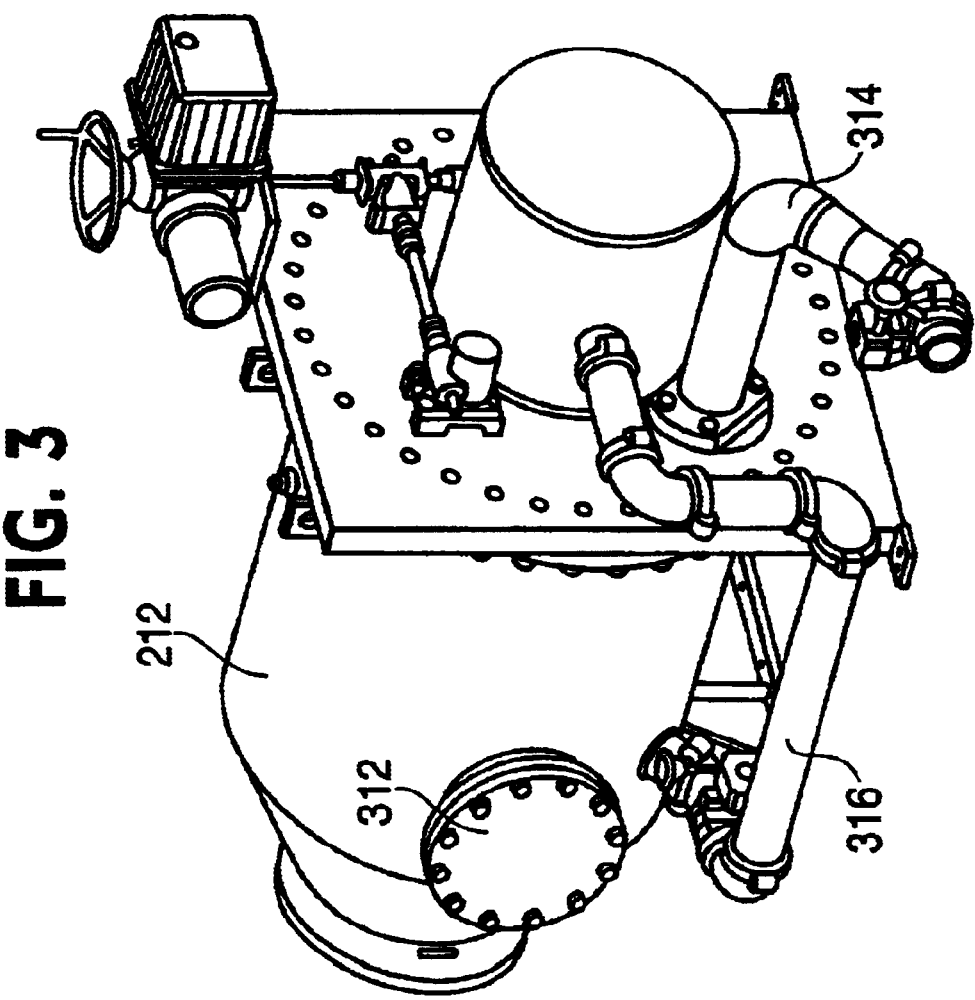
FIG. 3 is a perspective view of the valve of FIG. 2.

As can be seen in FIG. 3, an inspection port 312 can be uncovered to provide access to the interior of a housing 212. The inspection port 312 can be used to provide relatively simple access to the nut 246, e.g. for replacement. In one embodiment, bolts 284a, b holding the nut 246 to the gate leg 221 are loosened and the nut 246 can be rotated to disengage it from the threaded rod 244 for removal through the inspection port 312. The process is reversed for replacing with a new nut 246.

If desired, the gate 222 can be provided with a groove or other conduit coupled to a waste outlet 314 (FIG. 3) and a controllable conduit 316 can be provided for routing high pressure inlet fluid to the interior of the sleeve 214 for backflow cleaning.

In light of the above discussion, a number of advantages of the present invention can be seen. The present invention can assist in reducing the length of a multiple-opening sleeve valve, e.g. to accommodate smaller spaces, facilitate retrofitting and/or reduce costs. The present invention can be used to eliminate the need for a sealed drive tube by locating instead, a drive nut preferably directly on a moving valve gate. The present invention can provide one or, preferably more, drive screws in-line with a valve gate (i.e. providing force substantially parallel to the axis of gate movement), avoiding reductions in force or efficiency (which can arise from applying force at an angle to desired movement) and can assist in providing relatively long valve stroke lengths (e.g. compared with limited stroke operating ranges of yoke or other drive devices). Providing long stroke length (for a given total valve length) can be useful in achieving precise control over the amount of flow or pressure through the valve, since a relatively large portion of the sleeve is available for distributing nozzles (which may be distributed in a graduated or non-periodic manner). Use of twin drive screws with higher column strength (with less resilience) can achieve a limited-profile valve with increased stroke. Internal attachment of the drive next to the valve gate allows the engagement surface to be lubricated by the fluid. The valve may then use a "nonrising" actuator. This provides net reduction in valve length which can be about one nominal valve diameter. Elimination of the need for external lubrication also eliminates grease spillage or other mess associated with traditional screw jack designs. The nut can be replaced through inspection ports in a relatively short time such as on the order of less than an hour, preferably less than about 15 minutes. In contrast to previous approaches utilizing shafts which move through a packing/stuffing box assembly, resulting in large friction and drag (e.g. due to "chevron" type packing) embodiments of the present invention, by using a rotating motion, drastically reduced drag. In addition, the pressure force is retained by thrust bearings resulting in up to a 20 fold or more reduction of thrust requirement compared to traditional designs such as those depicted in FIG. 1. The present invention can also be useful in achieving high precision in gate placement, reducing mechanical tolerance or "slop," backlash and the like.

A number of variations and modifications of the invention can be used. It is possible to use some features of the invention without using others. For example, it is possible (although not necessarily advisable) to eliminate drive tubes without reducing the overall length of the valve (for a given valve size). It is possible to provide a reduced-length valve without providing for backwash. Although, examples of stainless steel and brass materials for a drive screw and/or nut were provided, other materials that can operate in a fluid or water environment and can eliminate the need for external lubrication can be used including materials coated or plated with low friction, inert materials, other metals or alloys such as chrome, plastics, ceramics and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A fluid control valve apparatus comprising:
   a generally cylindrical housing;
   an inlet located at a first position on said housing;
   an outlet located at a second position on said housing;
   a sleeve at least partially positioned within said housing defining a region exterior to said sleeve and a region interior to said sleeve, said region exterior to said sleeve being in fluid communication with said inlet opening and said region interior to said sleeve being in fluid communication with said outlet opening; said sleeve defining a perforated region having a plurality of perforations, wherein said sleeve is configured so that the fluid flows from the region exterior to said sleeve through said plurality of perforations to the region interior to said sleeve;

a gate movable parallel to a gate movement axis between a closed position substantially covering said perforated region and a fully open position allowing fluid flow through said perforations to said interior region of said sleeve, said gate having a leg extending radially therefrom; and an actuator assembly at least indirectly coupled to said gate which provides a force substantially parallel to said gate movement axis wherein at least a first moveable portion of said actuator assembly contacts fluid moving through said valve, wherein said actuator assembly comprises at least a first threaded rotatable drive screw which engages a first threaded nut coupled to said leg and wherein said drive screw has a free end;

wherein both of said first threaded nut and said first drive screw are in contact with said fluid, and wherein said housing has an integral region that surrounds said sleeve, said nut, and said free end of said drive screw has a free end surrounded by said housing.

2. An apparatus as claimed in claim 1, wherein said first threaded nut and first drive screw are provided in the absence of external lubrication.

3. An apparatus, as claimed in claim 1, wherein at least one of a threaded surface of said first threaded drive screw and a threaded surface of said first threaded nut includes material selected from the group consisting of stainless steel and brass.

4. An apparatus, as claimed in claim 1, wherein said actuator is provided in the absence of an interiorly threaded drive tube sealed from contact with fluid passing through said valve.

5. An apparatus, as claimed in claim 1, wherein said gate moves through a stroke defining a stroke length substantially equal to a diameter of said inlet opening.

6. An apparatus as claimed in claim 1, further comprising a conduit which provides pressurized fluid to said interior region of said sleeve substantially without first passing through said perforations, to achieve backwash.

7. An apparatus, as claimed in claim 1, wherein said nut is coupled to said gate at a location spaced from an upstream edge of said gate.

8. An apparatus, as claimed in claim 1, wherein said location is substantially adjacent a downstream edge of said gate.

9. An apparatus, as claimed in claim 1, wherein said first nut and said first drive screw are positioned substantially internal to said housing.

10. An apparatus, as claimed in claim 1, wherein said actuator is provided with at least a first thrust bearing.

11. An apparatus, as claimed in claim 1, wherein said actuator is provided substantially in the absence of axial movement of a component through a seal which is subjected to pressure of said fluid on one side thereof.

12. An apparatus, as claimed in claim 1, wherein said plurality of perforations have a given diameter.

13. An apparatus, as claimed in claim 12, wherein said plurality of perforations are spaced apart from one another a distance approximately equal to two (2) times said given diameter.

14. A fluid control valve apparatus comprising:
a generally cylindrical housing;
an inlet located at a first portion on said housing;
an outlet located at a second portion on said housing;
a sleeve at least partially positioned within said housing defining a region exterior to said sleeve and a region interior to said sleeve, said region exterior to said sleeve being in fluid communication with said inlet opening and said region interior to said sleeve being in fluid communication with said outlet opening; said sleeve defining a perforated region having a plurality of perforations, wherein said sleeve is configured so that the fluid flows from the region exterior to said sleeve through said plurality of perforations to the region interior to said sleeve;

a gate movable parallel to a gate movement axis between a closed position substantially covering said perforated region and a fully open position allowing fluid flow through said perforations to said interior region of said sleeve;

an actuator assembly having dual drive screws, each having a free end, said actuator assembly at least indirectly coupled to said gate which provides a force substantially parallel to said gate movement axis wherein at least a first moveable portion of said actuator assembly contacts fluid moving through said valve; and a conduit which provides pressurized fluid to said interior region of said sleeve substantially without first passing through said perforations, to achieve backwash, wherein said free ends are in contact with the fluid and wherein said housing has an integral region that surrounds said sleeve and said drive screws.

15. An apparatus, as claimed in claim 14, further comprising a sealable inspection port in said housing, wherein said sealable inspection port has an area less than about a cross-sectional area of said inlet port opening.

16. A method for fluid control comprising:
providing a generally cylindrical housing;
an inlet located at a first portion on said housing;
an outlet located at a second portion on said housing;
positioning a sleeve at least partially within said housing so as to define a region exterior to said sleeve and a region interior to said sleeve, said region exterior to said sleeve being in fluid communication with said inlet opening and said region interior to said sleeve being in fluid communication with said outlet opening; said sleeve defining a perforated region having a plurality of perforations, wherein said sleeve is configured so that the fluid flows from the region exterior to said sleeve through said plurality of perforations to the region interior to said sleeve;

positioning a gate, having a leg radially extending from said gate, with respect to said sleeve so said gate is moveable parallel to a gate movement axis between a closed position substantially covering said perforated region and a fully open position allowing fluid flow through said perforations to said interior region of said sleeve;

coupling an actuator assembly to said gate for providing a force substantially parallel to said gate movement axis wherein at least a first moveable portion of said actuator assembly contacts fluid moving through said valve;

coupling said inlet opening of said housing to a high-pressure fluid source; and coupling said outlet opening to a low pressure fluid conduit, wherein said step of coupling an actuator comprises engaging at least a first threaded rotatable drive screw with a first threaded nut coupled to said leg and wherein said drive screw has a free end such that both of said first threaded nut and said first drive screw are in contact with said fluid, wherein the housing has an integral region that surrounds said sleeve, said nut, and said free end of said drive screw.

17. A method as claimed in claim 16, wherein said step of coupling an actuator comprises engaging at least a first threaded rotatable drive screw with a first threaded nut coupled to said gate such that at least one of said first threaded nut and said first drive screw is in contact with said fluid.

18. A method as claimed in claim 16 wherein when said gate moves between said closed position and said fully open position, said gate moves through a distance substantially equal to or greater than a diameter of said inlet opening.

19. A method as claimed in claim 16 further comprising:

flowing at least a first portion of said fluid to said interior region of said sleeve substantially without first passing through said perforations, to achieve backwash.

20. A fluid control valve apparatus comprising:

a cylindrical housing;

an inlet means located at a first portion on said housing;

an outlet means located at a second portion on said housing;

a sleeve at least partially positioned within said housing defining a region exterior to said sleeve and a region interior to said sleeve, said region exterior to said sleeve being in fluid communication with said inlet means and said region interior to said sleeve being in fluid communication with said outlet means; said sleeve defining a perforated region having a plurality of perforations, wherein said sleeve is configured so that the fluid flows from the region exterior to said sleeve through said plurality of perforations to the region interior to said sleeve;

gate means moveable parallel to a gate movement axis between a closed position and a fully open position, said gate means for substantially covering said perforated region in said closed position and for allowing fluid to flow through said perforations to said interior region of said sleeve in said fully open position, said gate means having a unitary leg extending radially therefrom;

actuator means at least indirectly coupled to said gate, for providing a force substantially parallel to said gate movement axis wherein at least a first moveable portion of said actuator means contacts fluid moving through said valve, wherein said actuator means comprises at least a first threaded rotatable drive screw which engages a first threaded nut coupled to said leg and wherein said drive screw has a free end; and wherein both of said first threaded nut and said first drive screw are in contact with said fluid, and wherein said housing has an integral region that surrounds said sleeve, said nut, and said free end of said drive screw.

21. Apparatus as claimed in claim 20 wherein said actuator means is provided in the absence of external lubrication.

22. Apparatus as claimed in claim 20 further comprising means for providing pressurized fluid to said interior region of said sleeve substantially without first passing through said perforations, to achieve backwash.

23. An apparatus as claimed in claim 20 wherein said actuator means comprises at least a first threaded rotatable drive screw which engages a first threaded nut coupled to said gate.

* * * * *